United States Patent [19]

Wamprecht et al.

[11] Patent Number: 5,208,291

[45] Date of Patent: May 4, 1993

[54] POWDER COATING COMPOSITIONS, A PROCESS FOR THEIR PRODUCTION AND THEIR USE FOR COATING HEAT-RESISTANT SUBSTRATES

[75] Inventors: Christian Wamprecht, Neuss; Reinhard Halpaap, Odenthal-Gloebusch; Hans-Joachim Kreuder, Toenisvorst; Manfred Bock, Leverkusen; Jürgen Meixner, Krefeld, all of Fed. Rep. of Germany; Rainer Rettig, Amagasaki, Japan; Wolfgang Schultz, Krefeld, Fed. Rep. of Germany

[73] Assignee: Bayer Aktiengesellschaft, Leverkusen Bayerwerk, Fed. Rep. of Germany

[21] Appl. No.: 941,498

[22] Filed: Sep. 8, 1992

[30] Foreign Application Priority Data

Sep. 12, 1991 [DE] Fed. Rep. of Germany ....... 4130336

[51] Int. Cl.$^5$ .............................................. C08G 18/80
[52] U.S. Cl. .................................. 525/124; 524/904; 528/45
[58] Field of Search .................. 525/124; 524/904; 528/45

[56] References Cited

U.S. PATENT DOCUMENTS

| | | | |
|---|---|---|---|
| 3,857,818 | 12/1974 | Frizelle | 528/45 |
| 3,867,347 | 2/1975 | Felber et al. | 525/124 |
| 3,960,824 | 6/1976 | Hicks | 525/123 |
| 3,993,849 | 11/1976 | Victorius | 525/124 |
| 4,093,674 | 6/1978 | Tsutsui et al. | 525/124 |
| 5,084,544 | 1/1992 | Müller et al. | 528/73 |
| 5,095,087 | 3/1992 | Witzeman et al. | 528/45 |

FOREIGN PATENT DOCUMENTS 1412882 11/1975 United Kingdom .

OTHER PUBLICATIONS

Chem. Abstract 84: 107 163s), 1975.

Primary Examiner—John Kight, III
Assistant Examiner—Rachel Johnson
Attorney, Agent, or Firm—Joseph C. Gil; Thomas W. Roy

[57] ABSTRACT

The present invention relates to a process for the production of powder coating compositions having a glass transition temperature of 20° to 80° C. by a) homogeneously dissolving in an inert solvent or solvent mixture having a boiling point or range between 50° and 150° C.
  A) a polyol component having a hydroxyl value of 30 to 155 and a glass transition temperature of 30° to 120° C. and containing at least one hydroxy-functional copolymer of olefinically unsaturated monomers,
  B) a polyisocyanate component containing blocked isocyanate groups, having a glass transition temperature of −45° to +45° C. and containing at least one ketoxime-blocked polyisocyanate and
  C) a catalyst component containing at least one catalyst for the reaction between blocked isocyanate groups and hydroxyl groups components,
  wherein components A) and B) are present in an amount which is sufficient to provide an equivalent ratio of blocked isocyanate groups to hydroxyl groups of 0.5:1 to 1.5:1,
b) freeing the resulting solution from the solvent and
c) simultaneously and/or subsequently converting the solid obtained into powder form.

The present invention also relates to the powder coating compositions obtained by this process and their use for the production of coatings of heat-resistant substrates.

20 Claims, No Drawings

POWDER COATING COMPOSITIONS, A PROCESS FOR THEIR PRODUCTION AND THEIR USE FOR COATING HEAT-RESISTANT SUBSTRATES

BACKGROUND OF THE INVENTION

1. Field of the Invention

This invention relates to a new process for the production of powder lacquers based on hydroxy-functional copolymers and ketoxime-blocked, lacquer-grade polyisocyanates and to the use of the powder lacquers obtained by this process for the production of coatings on heat-resistant substrates.

2. Description of the Prior Art

Oxime-blocked polyisocyanates and their use in powder coatings are already known (see, for example, EP-A-432,257 (WO 91/00267) U.S. Pat. No. 3,857,818, DE-OS 2,200,342 or Japanese patent application 70-94 941, publication No. 75-27 057 (C.A. 84: 107 163 s)). Some of these publications also mention the combination of the oxime-blocked polyisocyanates with hydroxy-functional copolymers. For example, the last-mentioned Japanese document describes the combination of (i) xylylene diisocyanate wherein the isocyanate groups are partly blocked with a special oxime, with (ii) a hydroxy-functional polyacrylate. Example 4 of U.S. Pat. No. 3,857,818 describes the combination (i) of a high-melting, butanone-oxime-blocked isocyanate prepolymer based on 4,4'-diisocyanatodicyclohexyl methane with (ii) a hydroxy-functional polyacrylate which is solid at room temperature.

Powder lacquers of the type in question are attended in particular by the disadvantage that they can only be stoved at relatively high temperatures because, due to the high melting points of the individual components, poor flow properties are obtained at moderately elevated temperatures.

Another disadvantage of the powder lacquers in question is that they only result in brittle, inflexible lacquer films which are unsuitable, for example, for coating automobiles where tough, elastic and flexible coatings are required.

Accordingly, an object of the present invention is to provide new powder coating compositions which may be cured at comparatively low temperatures of 120° to 160° C., possess satisfactory flow at comparatively low temperatures and result in high-quality coatings.

This object may be achieved in accordance with the process of the present invention which is described in detail hereinafter. The choice of the binder components A) and B), the use of catalyst C) and the production of the powder coating compositions via the intermediate stage of a homogeneous solution of the individual constituents mentioned, are critical to the invention.

SUMMARY OF THE INVENTION

The present invention relates to a process for the production of powder coating compositions having a glass transition temperature of 20° to 80° C. by a) homogeneously dissolving in an inert solvent or solvent mixture having a boiling point or range between 50° and 150° C.

A) a polyol component having a hydroxyl value of 30 to 155 and a glass transition temperature of 30° to 120° C. and containing at least one hydroxy-functional copolymer of olefinically unsaturated monomers, B) a polyisocyanate component containing blocked isocyanate groups, having a glass transition temperature of −45° to +45° C. and containing at least one ketoxime-blocked polyisocyanate selected from the group consisting of i) polyisocyanates containing one or more biuret, isocyanurate, uretdione and urethane groups and prepared from 1,6-diisocyanatohexane, ii) polyisocyanates containing isocyanurate groups and prepared from mixtures of 1,6-diisocyanatohexane and 1-isocyanato-3,3,5-trimethyl-5-isocyanatomethyl cyclohexane and iii) polyisocyanates containing isocyanurate groups and uretdione groups and prepared from mixtures of 1,6-diisocyanatohexane and 1-isocyanato-3,3,5-trimethyl-5-isocyanatomethyl cyclohexane and C) a catalyst component containing at least one catalyst for the reaction between blocked isocyanate groups and hydroxyl groups components, wherein components A) and B) are present in an amount which is sufficient to provide an equivalent ratio of blocked isocyanate groups to hydroxyl groups of 0.5:1 to 1.5:1, b) freeing the resulting solution from the solvent and c) simultaneously and/or subsequently converting the solid obtained into powder form.

The present invention also relates to the powder coating compositions obtained by this process and their use for the production of coatings on heat-resistant substrates.

DETAILED DESCRIPTION OF THE INVENTION

The polyol component A) has a hydroxyl value of 30 to 155, preferably 40 to 120 mg KOH/g and a glass transition temperature, $T_g$, as determined by differential thermoanalysis (DTA), of 30 to 120, preferably 50° to 100° C. and is obtained by copolymerization of a monomer mixture containing a) 0 to 70 parts by weight of methyl methacrylate, b) 0 to 60 parts by weight of (cyclo)alkyl esters of acrylic and/or methacrylic acid containing 2 to 12 carbon atoms in the alkyl or cycloalkyl component, c) 0 to 50 parts by weight of aromatic vinyl compounds, d) 6 to 40 parts by weight of hydroxyalkyl esters of acrylic and/or methacrylic acid, e) 0 to 5 parts by weight of olefinically unsaturated carboxylic acids, wherein the sum of the parts by weight of components a) to e) is 100.

The binder component A) is preferably a copolymer of a) 10 to 60 parts by weight of methyl methacrylate, b) 5 to 50 parts by weight of (cyclo)alkyl esters of acrylic and/or methacrylic acid containing 2 to 12 carbon atoms in the (cyclo)alkyl component, c) 5 to 40 parts by weight of aromatic vinyl compounds, d) 10 to 35 parts by weight of hydroxyalkyl esters of acrylic and/or methacrylic acid and e) 0 to 5.0 parts by weight of acrylic acid and/or methacrylic acid, wherein the sum of the parts by weight of components a) to e) is 100.

The monomers b) are preferably (cyclo)alkyl esters of acrylic or methacrylic acid containing 2 to 12 carbon atoms in the (cyclo)alkyl component. Examples of suitable and preferred monomers b) include ethyl (meth)acrylate, n-propyl (meth)acrylate, isopropyl (meth)acrylate, n-butyl (meth)acrylate, isobutyl (meth)acrylate, tert. butyl (meth)acrylate, 2-ethylhexyl (meth)acrylate, cyclohexyl methacrylate, neopentyl methacrylate, isobornyl methacrylate and 3,3,5-trimethyl cyclohexyl methacrylate.

Suitable monomers c) include styrene, vinyl toluene and α-ethyl styrene.

Suitable monomers d) are hydroxyalkyl esters of the above-mentioned acids containing 2 to 6 and preferably 2 to 4 carbon atoms in the hydroxyalkyl component such as 2-hydroxyethyl (meth)acrylate, hydroxypropyl (meth)acrylate (isomer mixture formed by the addition of propylene oxide onto (meth)acrylic acid), 4-hydroxy-n-butyl acrylate and also adducts of ε-caprolactone with these simple hydroxyalkyl esters. Accordingly, the term "hydroxyalkyl ester" is also intended to embrace ester-functional residues of the type formed by addition of ε-caprolactone onto simple hydroxyalkyl esters. In addition, reaction products of glycidyl (meth)acrylate with saturated monocarboxylic acids and reaction products of (meth)acrylic acid with saturated monoepoxides, which may additionally contain OH groups, are embraced by the term "hydroxyalkyl esters" of (meth)acrylic acid and, thus, are also suitable as monomers d).

In a particularly preferred embodiment, the polyol component A) contains hydroxy-functional copolymers prepared from
  a) 15 to 50 parts by weight of methyl methacrylate,
  b) 10 to 45 parts by weight of alkyl esters of acrylic and/or methacrylic acid containing 2 to 12 carbon atoms in the alkyl component,
  c) 5 to 35 parts by weight of styrene,
  d) 10 to 30 parts by weight of 2-hydroxyethyl methacrylate and/or the hydroxypropyl methacrylate adduct of propylene oxide with methacrylic acid and containing 2-hydroxypropyl methacrylate and 2-hydroxy-1-methyl-ethyl methacrylate in a ratio of approx. 3:1) and
  e) 0.1 to 3 parts by weight of acrylic acid and/or methacrylic acid,
wherein the sum of the parts by weight of components a) to e) is 100.

In the production of the hydroxy-functional copolymers, mixtures of monomers a) to e) are used within the ranges of amounts previously set forth, provided that these amounts result in copolymers having hydroxyl values and glass transition temperatures within the previously described ranges. This latter condition, which is critical to the usefulness of the copolymers according to the invention, is fulfilled when a suitable ratio of "softening" monomers (which lead to a reduction in the glass transition temperature of the copolymers) to "hardening" monomers (which lead to an increase in the glass transition temperature) is used for the production of the copolymers.

"Softening" monomers include alkyl esters of acrylic acid such as ethyl acrylate, n-butyl acrylate, isobutyl acrylate and 2-ethylhexyl acrylate.

"Hardening" monomers include alkyl esters of methacrylic acid such as methyl methacrylate, ethyl methacrylate, isobutyl methacrylate, cyclohexyl methacrylate, isopropyl methacrylate, tert. butyl methacrylate, neopentyl methacrylate, isobornyl methacrylate and 3,3,5-trimethyl cyclohexyl methacrylate, and aromatic vinyl compounds such as styrene, vinyl toluene and α-ethyl styrene.

The hydroxy-functional copolymers A) are produced by the radical-initiated copolymerization of the previously described monomers in suitable organic solvents. The monomers are copolymerized at temperatures of 60° to 180° C., preferably 80° to 160° C. in the presence of radical formers and, optionally, molecular weight regulators.

Solvents of the same type as those which are subsequently used for carrying out the process according to the invention are preferably used for the production of the copolymers. These solvents have a boiling point or boiling range at 1013 mbar of 50° to 150° C., preferably 75° to 130° C. Solvents suitable for the production of the copolymers and for carrying out the process according to the invention include aromatic hydrocarbons such as toluene and xylene; esters such as methyl acetate, ethyl acetate, isopropyl acetate, n-propyl acetate, isobutyl acetate, n-butyl acetate and methyl-n-amyl acetate; ketones such as 2-propanone, 2-butanone, 2-pentanone, 3-pentanone, 3-methyl-2-butanone, 4-methyl-2-pentanone, 5-methyl-2-hexanone and 2-heptanone; and mixtures of these solvents.

The production of the copolymers may be carried out continuously or discontinuously. Preferably, the monomer mixture and the initiator are introduced uniformly and continuously into a polymerization reactor and, at the same time, the corresponding quantity of polymer is continuously removed. Copolymers which are substantially chemically uniform may also be produced with advantage by introducing the reaction mixture at a constant rate into a stirred tank without removing the polymer.

It is also possible, for example, to initially introduce part of the monomers in solvents of the type mentioned and subsequently to introduce the remaining monomers and auxiliaries either separately or together at the reaction temperature. In general, the polymerization reaction takes place under atmospheric pressure, although it may also be carried out under pressures of up to 25 bar. The initiators are used in quantities of 0.05 to 15% by weight, based on the total quantity of monomers.

Suitable initiators are known and include aliphatic azo compounds such as azo-diisobutyronitrile, azo-bis-2-methylvaleronitrile, 1,1'-azo-bis-1-cyclohexane nitrile and 2,2'-azo-bis-isobutyric acid alkyl ester; symmetrical diacyl peroxides such as acetyl, propionyl or butyryl peroxide, bromine-, nitro-, methyl- or methoxy-substituted benzoyl peroxides and lauryl peroxides; symmetrical peroxydicarbonates such as diethyl, diisopropyl, dicyclohexyl and dibenzoyl peroxydicarbonate; tert. butyl peroxy-2-ethyl hexanoate; tert. butyl perbenzoate; hydroperoxides such as tert. butyl hydroperoxide and cumene hydroperoxide; and dialkyl peroxides such as dicumyl peroxide, tert. butyl cumyl peroxide and di-tert. butyl peroxide.

Typical regulators may be used in the production of the copolymers to regulate their molecular weight. Examples of suitable regulators include tert. dodecyl mercaptan, n-dodecyl mercaptan or diisopropyl xanthogen disulfide. The regulators may be added in quantities of 0.1 to 10% by weight, based on the total quantity of monomers.

The solutions present during the copolymerization process are available for mixing with the blocked polyisocyanates B), the catalyst component C) and the optional auxiliaries and additives D).

The polyisocyanate component B) is preferably selected from completely ketoxime-blocked lacquer-grade polyisocyanates which, in blocked form, have a glass transition temperature, $T_g$, as determined by differential thermoanalysis (DTA), of $-45°$ to $+45°$ C., preferably $-40°$ to $+20°$ C; an average functionality of 2.0 to 5.0, preferably 3.0 to 5.0; and a content of blocked isocyanate groups (expressed as NCO, molecular weight=42) of 3.0 to 20.0, preferably 12.0 to 18.0% by weight.

The polyisocyanate component B) contains at least one ketoxime-blocked polyisocyanate selected from polyisocyanates containing biuret, isocyanurate, uretdione and/or urethane groups and prepared from 1,6-diisocyanatohexane and polyisocyanates containing isocyanurate and optionally uretdione groups and prepared from 1,6-diisocyanatohexane and 1-isocyanato-3,3,5-trimethyl-5-isocyanatomethyl cyclohexane in a ratio by weight of 5:1 to 1:5. The ketoxime-blocked polyisocyanates may contain one or more of the various groups in the same molecule. The unblocked polyisocyanates from which the blocked polyisocyanates are prepared preferably have a residual content of 1,6-diisocyanatohexane of at most 1.0% by weight, preferably, at most 0.5% by weight. In a particularly preferred embodiment, butanone-oxime-blocked biuret polyisocyanates or isocyanurate polyisocyanates prepared from 1,6-diisocyanato-hexane are used as component B).

The polyisocyanates to be blocked with ketoximes are produced by standard methods, for example, by biuretization, dimerization, trimerization and/or urethanization of the starting monomeric diisocyanates. These methods are described, for example, in the following publications:

polyisocyanates containing biuret groups: DE-PS 1,101,394, DE-OS 1,570,632, DE-OS 2,308,015, DE-OS 2,437,130, DE-OS 2,654,745, DE-OS 2,803,103, DE-OS 2,808,801, DE-OS 2,918,739, DE-OS 3,007,679, DE-OS 3,403,277, DE-OS 3,403,278, DE-PS 3,700,209 and EP-A 3,505;

polyisocyanates containing uretdione groups: DE-OS 2,502,934;

polyisocyanates containing urethane groups: U.S. Pat. No. 3,183,112;

polyisocyanates containing isocyanurate groups: DE-AS 1,667,309, DE-OS 3,100,262, DE-OS 3,219,608, DE-OS 3,240,613, EP-A 10,589, EP-A 57,653, EP-A 89,297 and EP-A 187,105;

polyisocyanates containing urethane and isocyanurate groups: EP-A 155,559 and DE-OS 3,811,350;

polyisocyanates containing urethane and biuret groups: EP-A 320,703.

Ketoximes suitable for blocking the polyisocyanates include those having a molecular weight of 73 to 200, for example, ketoximes based on aliphatic or cycloaliphatic ketones such as 2-propanone, 2-butanone, 2-pentanone, 3-pentanone, 3-methyl-2-butanone, 4-methyl-2-pentanone, 3,3-dimethyl-2-butanone, 2-heptanone, 3-heptanone, 4-heptanone, 5-methyl-3-heptanone, 2,6-dimethyl-4-heptanone, cyclopentanone, cyclohexanone, 3-methyl cyclohexanone, 3,3,5-trimethyl cyclohexanone and 3,5,5-trimethyl-2-cyclohexen-5-one. Preferred blocking agents include acetone oxime, butanone oxime and cyclohexanone oxime.

The blocking reaction of the isocyanate groups with the blocking agents mentioned above is best carried out at temperatures of 20° to 120° C., preferably 20° to 80° C. The blocking reaction may be carried out both in the absence of solvents and in inert organic solvents as previously described.

The catalysts C) are those which promote the addition reaction between hydroxyl groups and isocyanate groups. Examples of these catalysts are metal compounds, tertiary amines and particularly organotin compounds. Preferred organotin compounds include tin(II) salts of carboxylic acids such as tin(II) acetate, tin(II) octanoate, tin(II) ethylhexanoate and tin(II) laurate; tin(IV) compounds such as dibutyl tin oxide, dibutyl tin dichloride, dibutyl tin diacetate, dibutyl tin dilaurate, dibutyl tin maleate and dioctyl tin diacetate; and mixtures of these catalysts.

Suitable tertiary amines include diazabicyclo(2,2,-2)octane and 1,5-diazabicyclo(4,3,0)non-5-ene.

Further representatives of suitable catalysts and information on their mechanisms can be found in Kunststoff-Handbuch, Vol. VII, edited by Vieweg and Hochtlen, Carl-Hanser-Verlag, Munchen 1966, for example on pages 96 to 102.

Especially preferred catalysts are tin(II) octanoate and dibutyl tin(IV) dilaurate.

The catalysts are generally used in quantities of 0.1 to 5% by weight, preferably 0.2 to 3% by weight, based on the solids content of components A) and B).

The auxiliaries and additives D) optionally used are those which are soluble in the solvents to be used in the process according to the invention. Examples of such auxiliaries and additives include flow control agents such as polybutyl acrylate or those based on polysilicones; light stabilizers such as sterically hindered amines; and UV absorbers such as benzotriazoles and benzophenones.

To carry out the process according to the invention, components A) to C) and, optionally, D) are dissolved in the previously described inert organic solvent or solvent mixture to provide a solution having a solids content of 10 to 80% by weight, preferably 30 to 60% by weight. The solvents used are preferably the solvents which have previously been used for the production of the copolymers and/or optionally used to dissolve the polyisocyanate component B) in advance. In the production of these solutions, components A) and B) are used in amounts which are sufficient to provide an equivalent ratio of blocked isocyanate groups of component B) to hydroxyl groups of component A) of 0.5:1 to 1.5:1, preferably 0.8:1 to 1.2:1.

The solutions obtained are then subjected to a solvent removal process in which the solvent or solvent mixture is removed as completely as possible. The solvent may be removed, for example, by spray drying, degassing in special or commercially available evaporation extruders or coil evaporators, and distillation under vacuum or in a high vacuum.

If processable powders are not directly obtained in this solvent removal process, the resulting solids are reduced to powder in known manner after removal of the solvent. Finally, the powders accumulating either directly during removal of the solvent or the powders obtained by grinding after removal of the solvent are optionally sieved to remove coarse fractions (for example, particles larger than 0.1 mm in diameter).

The resulting clear powder coating composition has a glass transition temperature $T_g$, as determined by differential thermoanalysis (DTA), of 20° to 80° C., preferably 25° to 75° C. This condition, which is critical to the usefulness of the powder coating compositions in accordance with the invention, is fulfilled when a suitable ratio between the glass transition temperatures of components A) and B) is used in the production of the powder coating composition. If, for example, the blocked polyisocyanate component B) has a glass transition temperature below 25° C., a copolymer A) which has a higher glass temperature, for example 70° C., must be used as the binder component so that the final powder coating composition reaches a glass transition temperature in the desired range.

If desired, the clear powder coating composition obtained by the process according to the invention may be melted in suitable extruders or kneaders, and may be mixed and homogenized with further auxiliaries and additives, more particularly inorganic or organic pigments. In the production of pigmented powder coating compositions, any necessary reduction to powder of the solids obtained in the process according to the invention is preferably carried out after they have been combined with the pigments.

The powder-form coating materials may be applied to the heat-resistant substrates to be coated by any of the known methods for applying powders, including electrostatic powder spraying and fluidized bed coating. The coatings may be cured by heating to temperatures of 120° to 200° C., preferably 120° to 160° C. The coating obtained are scratchproof, resistant to solvents and chemicals and show very good optical and mechanical properties, more particularly high resistance to light and weathering, so that they are particularly suitable for external applications. Any heat-resistant substrates, for example glass or metal substrates, may be coated in accordance with the invention. A preferred application for the unpigmented powder coating compositions produced in accordance with the invention is the production of clear coatings for automobiles.

In the following examples, parts and percentages are by weight, unless otherwise indicated.

I. General procedure for the production of hydroxy-functional copolymers $A_1$ to $A_4$ Part I was introduced into a 25 liter stainless steel pressure reactor equipped with a stirrer, a heating and cooling system and electronic temperature control and heated to the reaction temperature. Part II (added over a total period of 4 hours) and part III (added over a total period of 5 hours) were then introduced at a constant temperature, followed by stirring for 2 hours at the temperature indicated. The polymer solutions obtained were ready for mixing with components B), C) and, optionally, D).

The reaction temperatures and the compositions of parts I to III are shown in Table I together with the characteristic data of the copolymers obtained.

TABLE 1

| Hydroxy-functional copolymers $A_1$ to $A_4$ (quantities in g) | | | | |
|---|---|---|---|---|
| | Copolymers | | | |
| | $A_1$ | $A_2$ | $A_3$ | $A_4$ |
| Part I | | | | |
| Toluene | 9000 | 9000 | | 9000 |
| Methyl isobutyl ketone | | | 9000 | |
| Part II | | | | |
| Methyl methacrylate | 3660 | 4328 | 3916 | 4308 |
| n-Butyl methacrylate | 2374 | 2690 | | |
| 2-Ethylhexyl acrylate | | | | 1958 |
| n-Butyl acrylate | | | 1958 | |

TABLE 1-continued

| Hydroxy-functional copolymers $A_1$ to $A_4$ (quantities in g) | | | | |
|---|---|---|---|---|
| | Copolymers | | | |
| | $A_1$ | $A_2$ | $A_3$ | $A_4$ |
| Styrene | 1868 | 1258 | 1958 | 980 |
| 2-Hydroxyethyl methacrylate | 1892 | 1418 | | |
| Hydroxypropyl methacrylate* | | | 1836 | 2360 |
| Acrylic acid | 100 | 98 | | |
| Methacrylic acid | | | 122 | 186 |
| Part III | | | | |
| Tert. butylperoxy-2-ethyl hexanoate (70% in isododecane) | 438 | 582 | 582 | 582 |
| Toluene | 668 | 626 | | 626 |
| Methyl isobutyl ketone | | | 628 | |
| Polymerization temperature (°C.) | 125 | 110 | 115 | 115 |
| Solids content (%) | 50.7 | 50.1 | 50.2 | 51.2 |
| Viscosity at 23° C. (mPa·s) | 1880 | 1320 | 270 | 2720 |
| OH value (solid resin) | 80 | 60 | 70 | 90 |
| Acid value (solid resin) | 7.4 | 4.8 | 3.9 | 6.0 |
| Glass transition temperature (°C.) | 67 | 66 | 60 | 54 |

*Adduct of propylene oxide with methacrylic acid

II. Butanone-oxime-blocked polyisocyanates B) Polyisocyanate $B_1$ 955 g of a biuret-modified polyisocyanate based on 1,6-diisocyanatohexane and having an NCO content of approx. 22.0% and 460 g of toluene were weighed into a 4 liter four-necked flask equipped with a stirrer, reflux condenser, thermometer and dropping funnel. 445 g of butanone oxime were then added dropwise over a period of 1 hour, followed by stirring until a free NCO content of $\leq 0.5\%$ was titrated and showed no further reduction. The 75% solution obtained had a viscosity at 23° C. of 5870 mPa.s and a blocked NCO content of 11.3% (expressed as NCO). It may be directly used for mixing with the polyacrylates A). The blocked polyisocyanate, which was present in solution, had a glass transition temperature $T_g$ of 3.1° C., based on solids.

Polyisocyanate $B_2$

Polyisocyanate $B_2$ was produced using the procedure described for Polyisocyanate $B_1$ from 972 g of an isocyanurate-modified polyisocyanate based on 1,6-diisocyanatohexane and having an NCO content of approx. 21.5%, 470 g of toluene and 445 g of butanone oxime. A 75% solution was obtained which had a viscosity at 23° C. of 1590 mPa.s and a blocked NCO content of 11.2% (expressed as NCO). The blocked polyisocyanate, which was present in solution, had a glass transition temperature $T_g$ of $-2.2°$ C., based on solids.

III. Process according to the invention and use of the products obtained by the process according to the invention To formulate powder coating compositions according to the invention, the polyacrylate polyols A), the blocked polyisocyanates B), the catalysts C) and, optionally, other auxiliaries D) were mixed for 1 hour at 60° C. in a 3-liter three-necked flask equipped with a stirrer, reflux condenser and thermometer. Light, clear or slightly clouded solutions were obtained. The solutions were optionally further diluted with solvents and were then completely freed from solvent in a commercially available spray dryer. The powder coating composition according to the invention was directly obtained in the form of a processable powder. The powders were freed by sieving from any particles larger than 0.1 mm in diameter, and then applied to test plates by means of an electrostatic spray unit and cured for 30 minutes at 150° C.

Instead of the spray dryer, any other evaporation unit, such as a coil evaporator or an evaporation extruder, may be used to remove the solvent. The polymer solutions were completely freed from solvent over a period of about 1 minute at a temperature of approx. 150° C. and under a vacuum of approx. 200 mbar. The polymers were granulated and ground after cooling.

The solvent resistance of the approximately 50 μm thick coatings was determined by a rubbing test using an acetone-impregnated cotton wool plug. The result was expressed as the number of double rub which the coating withstood without visibly changing. No film was subjected to more than 50 double rubs.

The respective formulations and the test results obtained for the coatings are set forth in Table 2.

TABLE 2

| Powder coating composition binders (quantities in g) | | | | |
|---|---|---|---|---|
| | Application Example | | | |
| | 1 | 2 | 3 | 4 |
| Polyacrylate A$_1$ | 1375 | | | |
| Polyacrylate A$_2$ | | 1833 | | |
| Polyacrylate A$_3$ | | | 1569 | |
| Polyacrylate A$_4$ | | | | 1220 |
| Polyisocyanate B$_1$ | | | 371 | 371 |
| Polyisocyanate B$_2$ | 375 | 375 | | |
| Catalyst C$_1$ (tin (II) octanoate) | 9.7 | 12.0 | | 8.8 |
| Catalyst C$_2$ (dibutyl tin dilaurate) | | | 10.6 | |
| Additive D (Perenol F 45*) | | | | 4.4 |
| Glass transition temperature (°C.) | 32 | 39 | 30 | 28 |
| Gloss (60°, Gardner) | 96 | 88 | 92 | 98 |
| Erichsen indentation (mm) | 5.6 | 4.2 | 5.6 | 5.9 |
| Acetone rubbing test, number of double rubs | 50 | 50 | 50 | 50 |

*Polyacrylate-based flow control agent; a product of Henkel KGaA, Düsseldorf

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a powder coating composition having a glass transition temperature of 20° to 80° C. which comprises
   a) homogeneously dissolving in an inert solvent or solvent mixture having a boiling point or range between 50° and 150° C.
      A) a polyol component having a hydroxyl value of 30 to 155 and a glass transition temperature of 30° to 120° C. and containing at least one hydroxy-functional copolymer of olefinically unsaturated monomers,
      B) a polyisocyanate component containing blocked isocyanate groups, having a glass transition temperature of −45° to +45° C. and containing at least one ketoxime-blocked polyisocyanate selected from the group consisting of
         i) polyisocyanates containing one or more biuret, isocyanurate, uretdione or urethane groups and prepared from 1,6-diisocyanatohexane,
         ii) polyisocyanates containing isocyanurate groups and prepared from mixtures of 1,6-diisocyanatohexane and 1-isocyanato-3,3,5-trimethyl-5-isocyanatomethyl cyclohexane and
         iii) polyisocyanates containing isocyanurate groups and uretdione groups and prepared from a mixture of 1,6-diisocyanatohexane and 1-isocyanato-3,3,5-trimethyl-5-isocyanatomethyl cyclohexane and
      C) a catalyst component containing at least one catalyst for the reaction between blocked isocyanate groups and hydroxyl groups components, wherein components A) and B) are present in an amount which are sufficient to provide an equivalent ratio of blocked isocyanate groups to hydroxyl groups of 0.5:1 to 1.5:1,
   b) freeing the resulting solution from the solvent and
   c) simultaneously and/or subsequently converting the solid obtained into powder form.

2. The process of claim 1 wherein component A) comprises a hydroxy-functional copolymer prepared from
   a) 0 to 70 parts by weight of methyl methacrylate,
   b) 0 to 60 parts by weight of at least one (cyclo)alkyl ester of acrylic and/or methacrylic acid containing 2 to 12 carbon atoms in the alkyl or cycloalkyl component,
   c) 0 to 50 parts by weight of at least one aromatic vinyl compound,
   d) 6 to 40 parts by weight of at least one hydroxyalkyl ester of acrylic and/or methacrylic acid and
   e) 0 to 5 parts by weight of olefinically unsaturated carboxylic acids, provided that the sum of the parts by weight of components a) to e) is 100.

3. The process of claim 1 wherein component A) comprises a hydroxy-functional copolymer prepared from
   a) 10 to 60 parts by weight of methyl methacrylate,
   b) 5 to 50 parts by weight of at least one (cyclo)alkyl ester of acrylic and/or methacrylic acid containing 2 to 12 carbon atoms in the alkyl or cycloalkyl component,
   c) 5 to 40 parts by weight of at least one aromatic vinyl compound,
   d) 10 to 35 parts by weight of at least one hydroxyalkyl ester of acrylic and/or methacrylic acid and
   e) 0 to 5.0 parts by weight of acrylic acid and/or methacrylic acid,
provided that the sum of the parts by weight of components a) to e) is 100.

4. The process of claim 1 wherein component B) has a content of ketoxime-blocked isocyanate groups (expressed as NCO) of 12 to 18% by weight and an (average) NCO functionality of 3.0 to 5.0.

5. The process of claim 3 wherein component B) has a content of ketoxime-blocked isocyanate groups (expressed as NCO) of 12 to 18% by weight and an (average) NCO functionality of 3.0 to 5.0.

6. The process of claim 4 wherein component B) comprises a butanone oxime blocked biuret polyisocyanate based on 1,6-hexamethylene diisocyanate or a butanone oxime blocked isocyanurate polyisocyanate based on 1,6-diisocyanatohexane.

7. The process of claim 5 wherein component B) comprises a butanone oxime blocked biuret polyisocyanate based on 1,6-hexamethylene diisocyanate or a butanone oxime blocked isocyanurate polyisocyanate based on 1,6-diisocyanatohexane.

8. The process of claim 1 wherein component C) comprises tin(II) octanoate and/or dibutyl tin(IV) dilaurate.

9. The process of claim 1 wherein the solution of components a), b) and c) prepared in step a) additionally contains a flow control agent and/or a light stabilizer.

10. A powder coating composition having a glass transition temperature of 20° to 80° C. which is prepared by a process which comprises
   a) homogeneously dissolving in an inert solvent or solvent mixture having a boiling point or range between 50° and 150° C.
      A) a polyol component having a hydroxyl value of 30 to 155 and a glass transition temperature of 30° to 120° C. and containing at least one hydroxy-functional copolymer of olefinically unsaturated monomers,
      B) a polyisocyanate component containing blocked isocyanate groups, having a glass transition temperature of −45° to +45° C. and containing at least one ketoxime-blocked polyisocyanate selected from the group consisting of
         i) polyisocyanates containing one or more biuret, isocyanurate, uretdione or urethane groups and prepared from 1,6-diisocyanatohexane,
         ii) polyisocyanates containing isocyanurate groups and prepared from mixtures of 1,6-diisocyanatohexane and 1-isocyanato-3,3,5-trimethyl-5-isocyanatomethyl cyclohexane and
         iii) polyisocyanates containing isocyanurate groups and uretdione groups and prepared from a mixture of 1,6-diisocyanatohexane and 1-isocyanato-3,3,5-trimethyl-5-isocyanatomethyl cyclohexane and
      C) a catalyst component containing at least one catalyst for the reaction between blocked isocyanate groups and hydroxyl groups components, wherein components A) and B) are present in an amount which are sufficient to provide an equivalent ratio of blocked isocyanate groups to hydroxyl groups of 0.5:1 to 1.5:1,
   b) freeing the resulting solution from the solvent and
   c) simultaneously and/or subsequently converting the solid obtained into powder form.

11. The powder coating composition of claim 10 wherein component A) comprises a hydroxy-functional copolymer prepared from
   a) 0 to 70 parts by weight of methyl methacrylate,
   b) 0 to 60 parts by weight of at least one (cyclo)alkyl ester of acrylic and/or methacrylic acid containing 2 to 12 carbon atoms in the alkyl or cycloalkyl component,
   c) 0 to 50 parts by weight of at least one aromatic vinyl compound,
   d) 6 to 40 parts by weight of at least one hydroxyalkyl ester of acrylic and/or methacrylic acid and
   e) 0 to 5 parts by weight of olefinically unsaturated carboxylic acids,
provided that the sum of the parts by weight of components a) to e) is 100.

12. The powder coating composition of claim 10 wherein component A) comprises a hydroxy-functional copolymer prepared from
   a) 10 to 60 parts by weight of methyl methacrylate,
   b) 5 to 50 parts by weight of at least one (cyclo)alkyl ester of acrylic and/or methacrylic acid containing 2 to 12 carbon atoms in the alkyl or cycloalkyl component,
   c) 5 to 40 parts by weight of at least one aromatic vinyl compound,
   d) 10 to 35 parts by weight of at least one hydroxyalkyl ester of acrylic and/or methacrylic acid and
   e) 0 to 5.0 parts by weight of acrylic acid and/or methacrylic acid,
provided that the sum of the parts by weight of components a) to e) is 100.

13. The powder coating composition of claim 10 wherein component B) has a content of ketoxime-blocked isocyanate groups (expressed as NCO) of 12 to 18% by weight and an (average) NCO functionality of 3.0 to 5.0.

14. The powder coating composition of claim 12 wherein component B) has a content of ketoxime-blocked isocyanate groups (expressed as NCO) of 12 to 18% by weight and an (average) NCO functionality of 3.0 to 5.0.

15. The powder coating composition of claim 13 wherein component B) comprises a butanone oxime blocked biuret polyisocyanate based on 1,6-hexamethylene diisocyanate or a butanone oxime blocked isocyanurate polyisocyanate based on 1,6-diisocyanatohexane.

16. The powder coating composition of claim 14 wherein component B) comprises a butanone oxime blocked biuret polyisocyanate based on 1,6-hexamethylene diisocyanate or a butanone oxime blocked isocyanurate polyisocyanate based on 1,6-diisocyanatohexane.

17. The powder coating composition of claim 10 wherein component C) comprises tin(II) octanoate and/or dibutyl tin(IV) dilaurate.

18. The powder coating composition of claim 10 wherein the solution of components a), b) and c) prepared in step a) additionally contains a flow control agent and/or a light stabilizer.

19. A coated heat-resistant substrate which has been coated with the powder coating composition having a glass transition temperature of 20° to 80° C. and prepared by a process comprising
   a) homogeneously dissolving in an inert solvent or solvent mixture having a boiling point or range between 50° and 150° C.
      A) a polyol component having a hydroxyl value of 30 to 155 and a glass transition temperature of 30° to 120° C. and containing at least one hydroxy-functional copolymer of olefinically unsaturated monomers,
      B) a polyisocyanate component containing blocked isocyanate groups, having a glass transition temperature of −45° to +45° C. and containing at least one ketoxime-blocked polyisocyanate selected from the group consisting of
         i) polyisocyanates containing one or more biuret, isocyanurate, uretdione or urethane groups and prepared from 1,6-diisocyanatohexane,
         ii) polyisocyanates containing isocyanurate groups and prepared from mixtures of 1,6-diisocyanatohexane and 1-isocyanato-3,3,5- trimethyl-5-isocyanatomethyl cyclohexane and iii) polyisocyanates containing isocyanurate groups and uretdione groups and prepared from a mixture of 1,6-diisocyanatohexane and 1-isocyanato-3,3,5-trimethyl-5-isocyanatomethyl cyclohexane and C) a catalyst component containing at least one catalyst for the reaction between blocked isocyanate groups and hydroxyl groups components, wherein components A) and B) are present in an amount which are sufficient to provide an equivalent ratio of blocked isocyanate groups to hydroxyl groups of 0.5:1 to 1.5:1, b) freeing the resulting solution from the solvent and c) simultaneously and/or subsequently converting the solid obtained into powder form.

20. The coated heat-resistant substrate of claim 19 wherein the coating is clear and the substrate is an automotive substrate.

* * * * *